US011429102B2

(12) United States Patent
Mielenz et al.

(10) Patent No.: US 11,429,102 B2
(45) Date of Patent: Aug. 30, 2022

(54) METHOD AND DEVICE FOR OPERATING AT LEAST TWO AUTOMATED VEHICLES

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart, NY (US)

( * ) Notice: Subject to any disclaimer, the term of this patent is extended or adjusted under 35 U.S.C. 154(b) by 281 days.

(21) Appl. No.: 16/645,961

(22) PCT Filed: Aug. 27, 2018

(86) PCT No.: PCT/EP2018/073035
§ 371 (c)(1),
(2) Date: Mar. 10, 2020

(87) PCT Pub. No.: WO2019/057447
PCT Pub. Date: Mar. 28, 2019

(65) Prior Publication Data
US 2020/0201327 A1    Jun. 25, 2020

(30) Foreign Application Priority Data

Sep. 19, 2017  (DE) .................... 10 2017 216 603.7

(51) Int. Cl.
*G05D 1/00*  (2006.01)
*G05D 1/02*  (2020.01)
(Continued)

(52) U.S. Cl.
CPC ......... *G05D 1/0088* (2013.01); *G05D 1/0212* (2013.01); *G05D 1/0276* (2013.01);
(Continued)

(58) Field of Classification Search
CPC .. G05D 1/0088; G05D 1/0212; G05D 1/0276; G08G 1/096716; G08G 1/096741; G08G 1/096775; G08G 1/22
(Continued)

(56) References Cited

U.S. PATENT DOCUMENTS

2012/0209505 A1\* 8/2012 Breed ................ G01C 21/3697
701/408
2015/0345963 A1    12/2015 Kratzsch et al.
(Continued)

FOREIGN PATENT DOCUMENTS

CN    101823486 A    9/2010
CN    206056604 U    3/2017
(Continued)

OTHER PUBLICATIONS

International Search Report for PCT/EP2018/073035, dated Nov. 28, 2018.

*Primary Examiner* — Yazan A Soofi
(74) *Attorney, Agent, or Firm* — Norton Rose Fulbright US LLP; Gerard Messina

(57) ABSTRACT

A method and device for operating at least two automated vehicles including picking up signals, which are transmitted in each case from the at least two automated vehicles; inputting a map as a function of the signals, determining a common driving strategy for the at least two automated vehicles in a way that optimizes a localization potential of the at least two automated vehicles on the basis of the map and as a function of the signals, and providing the common driving strategy for operating the at least two automated vehicles. A vehicle device for operating an automated vehicle, which includes a transmitter and receiver device, and a control unit is also provided.

9 Claims, 4 Drawing Sheets

(51) Int. Cl.
*G08G 1/0967* (2006.01)
*G08G 1/00* (2006.01)
(52) U.S. Cl.
CPC . *G08G 1/096716* (2013.01); *G08G 1/096741* (2013.01); *G08G 1/096775* (2013.01); *G08G 1/22* (2013.01)
(58) Field of Classification Search
USPC .......................................................... 701/23
See application file for complete search history.

(56) References Cited

U.S. PATENT DOCUMENTS

| | | | |
|---|---|---|---|
| 2016/0356623 | A1* | 12/2016 | Matsumoto ............. G01S 19/42 |
| 2017/0124781 | A1* | 5/2017 | Douillard .............. G01S 17/931 |
| 2017/0213459 | A1 | 7/2017 | Ogaz |
| 2022/0046468 | A1* | 2/2022 | Altintas ................ H04L 67/108 |

FOREIGN PATENT DOCUMENTS

| | | |
|---|---|---|
| DE | 102012219850 | 4/2014 |
| DE | 102012222869 | 6/2014 |
| DE | 102015008353 | 2/2016 |
| DE | 102014224099 | 6/2016 |
| DE | 102016209801 | 12/2016 |
| DE | 102015220360 | 4/2017 |
| DE | 102015220449 | 4/2017 |
| DE | 102015016758 | 6/2017 |
| WO | 2016139748 | 9/2016 |

* cited by examiner

METHOD AND DEVICE FOR OPERATING AT LEAST TWO AUTOMATED VEHICLES

The present invention relates to a method, as well as to a device for operating at least two automated vehicles including a picking up signals, inputting a map as a function of the signals, determining a common driving strategy for the at least two automated vehicles in a way that optimizes a localization potential of the at least two automated vehicles on the basis of the map and as a function of the signals, and a providing the common driving strategy for operating the at least two automated vehicles. The present invention also relates to a vehicle device for operating an automated vehicle.

SUMMARY

An example method in accordance with the present invention for operating at least two automated vehicles includes picking up signals, which are each transmitted from the at least two automated vehicles, and inputting a map as a function of the signals. The example method according to the present invention also includes determining a common driving strategy for the at least two automated vehicles in a way that optimizes a localization potential of the at least two automated vehicles on the basis of the map and as a function of the signals, and providing the common driving strategy for operating the at least two automated vehicles.

An automated vehicle is understood to be a partially, highly or fully automated vehicle.

Inputting a map is understood, for example, to be inputting a partial section of the map as a function of a particular start location or destination of the at least two automated vehicles. Furthermore, upon inputting the map, a depth of detail, respectively a resolution of the map may vary, for example, as a function of the particular driving environment sensor system of the at least two automated vehicles.

A map is understood, for example, to be a digital map which, in conjunction with a navigation system and/or a control unit of the automated vehicle and/or in conjunction with a smart phone, which is connected to the automated vehicle, respectively, is included in the same, is designed, for example, for localizing the automated vehicle and/or for executing a driving function as a function of the localization, etc.

A signal is understood to be a digital message, for example, which includes a start location and/or a destination of the automated vehicle and/or information (size, weight, load, height, maximum velocity, etc.) of the automated vehicle.

A driving strategy is understood, for example, to be a selection for a trajectory of the automated vehicle and/or corresponding control commands for controlling a transverse and/or a longitudinal control of the automated vehicle along the trajectory. Furthermore, the driving strategy includes a selection whereby at least one of the at least two automated vehicles follows at least one further one of the at least two automated vehicles at a certain distance and/or at a certain velocity or drives ahead of the same.

A localization potential is understood, for example, to be the accuracy with which an automated vehicle determines the own position thereof, using GNSS coordinates, for example. The knowledge of the own-vehicle—highly accurate position—is crucially important for the safe operation of an automated vehicle. Accuracy is understood, for example, to include the fuzziness with which this highly accurate position may be determined. The less fuzziness, the greater the accuracy and also the greater the localization potential are.

The example method in accordance with the present invention advantageously overcomes the problem of a large number of (automated) vehicles often being under way at the same time, thereby leading to a high traffic density. This often signifies longer trips and higher pollutant emissions than absolutely necessary. This problem is overcome by the example method according to the present invention by forming what is generally referred to as a grouping of at least two automated vehicles, which, on the one hand, for example, saves space on the roads (smaller distances between the at least two automated vehicles leads altogether to a lower traffic density) and—for example, due to the lower traffic density—leads to shorter trips. This, in turn, increases the satisfaction of occupants, respectively of all operators of an automated vehicle (delivery services, etc.) and, moreover, often saves money and reduces pollutant emissions (on the one hand, due to the reduced driving time and, on the other hand, because driving in a group results in lower pollutant emissions also due to the lower air resistance). In addition, the method according to the present invention overcomes the problem of safely operating automated vehicles, which requires a high localization potential that is enhanced by the method. A high localization potential also results in distances to other traffic participants and/or other sources of danger (restriction of a traffic route, construction sites, grade crossings, etc.) being recognized and/or determined in time, and, thus, in an ability to execute an appropriate driving strategy, respectively avoidance maneuvers, etc.

The common driving strategy preferably includes a respective trajectory for each of the at least two automated vehicles, and the at least two automated vehicles are operated along the respective trajectory.

The advantageous result is an effective and simple common operation of the at least two automated vehicles. In addition, safety-relevant selections (distances, etc.) may thus be specified and controlled.

The map preferably includes at least one localization feature.

The at least one localization feature is constituted, for example, of a traffic sign and/or of a building and/or of a pavement marking and/or of road lighting devices and/or of localization devices—which are specially designed, for example, to be detected by a driving environment sensor system of an automated vehicle—and/or further driving environment features which are suited, for example, for being detected by a driving environment sensor system that is able to determine a distance and/or a relative movement to the at least one driving environment feature. The localization feature is thereby stored in the map, for example, along with a highly accurate position.

A highly accurate position is understood to be a position which is so accurate within a specified coordinate system, such as GNSS coordinates, for example, that it does not exceed a maximally permissible fuzziness. The maximum fuzziness may thereby be dependent on the driving environment of the automated vehicle, for example. In addition, the maximum fuzziness may thereby depend on whether the automated vehicle is operated in partial, high or full automation. In principle, the maximum fuzziness is so low that a safe operation of the automated vehicle is ensured. The maximum fuzziness for a fully automated operation of the automated vehicle lies, for example, on the order of about 10 centimeters.

The localization potential of the at least two automated vehicles is preferably optimized by the common driving strategy including the respective trajectory for each of the at least two automated vehicles in such a way that each of the at least two automated vehicles detect the at least one localization feature during the operation, in each case via a driving environment sensor system.

Since a safe and reliable operation of an automated vehicle depends in many cases on the knowledge of a highly accurate position of the automated vehicle, this position may advantageously be determined by the localization feature in the map. The highly accurate position is determined, for example, by detecting the localization feature and determining a position of the automated vehicle relative thereto. This is accomplished, for example, on the basis of a direction vector and a distance between the localization feature and the automated vehicle. Thus, using the position of the localization feature (known from the map) and the relative position as a basis, the highly accurate position of the automated vehicle may be determined—for example, by vector addition.

The localization potential of the at least two automated vehicles is preferably optimized by the common driving strategy including the respective trajectory for each of the at least two automated vehicles in such a way that at least one of the at least two automated vehicles detects the at least one localization feature via a driving environment sensor system, and a transmission device transmits the at least one localization feature and/or a localization indication of the at least one localization feature to each further one of the two automated vehicles.

The driving environment sensor system is understood, for example, to be at least one video sensor and/or at least one lidar sensor and/or at least one ultrasound sensor and/or at least one further sensor designed for detecting a driving environment of the automated vehicle—and thus localization features therein.

Here, the advantage is derived, for example, that there is no need for each of the at least two automated vehicles to detect the localization feature, rather, in principle, only one, and the information (for example, the localization indication in the form of highly precise coordinates) is transmitted to all further vehicles of the at least two automated vehicles. This enhances the safety for all of the vehicles involved.

The signals preferably represent at least one current location in each particular case and one destination in each particular case of the at least two automated vehicles and/or state variables of the at least two automated vehicles.

State variables are understood, for example, to be sizes of the vehicles and/or air resistances and/or descriptions of the respective driving environment sensor system and/or requests for urgency (how rapidly or urgently should an automated vehicle travel from the starting point thereof to the destination thereof), etc.

Here, the advantage is derived that the driving strategy is adapted even more effectively to the at least two automated vehicles and/or, for example, to special requests and/or particular circumstances of an operator of the at least two automated vehicles, etc. This increases the effectiveness of the method and the satisfaction of all operators.

An example device in accordance with the present invention for operating at least two automated vehicles includes a transmitter and receiver unit for picking up signals, which are transmitted in each case from the at least two automated vehicles, and is designed for providing the common driving strategy for operating at least two automated vehicles. The example device in accordance with the present invention also includes an input unit for inputting a map as a function of the signals and a processing unit for determining a common driving strategy for the at least two automated vehicles in a way that optimizes a localization potential of the at least two automated vehicles on the basis of the map and as a function of the signals.

The transmitter and receiver unit and/or the input unit and/or the processing unit are/is designed for implementing a method in accordance with the present invention.

The example vehicle device according to the present invention for operating an automated vehicle includes a transmitter and receiver device for transmitting a signal to an external server and for receiving a driving strategy from the external server, and a driving environment sensor system for detecting at least one localization feature, the at least one localization feature being detected at least as a function of the driving strategy, and includes a control unit for operating the automated vehicle as a function of the driving strategy and as a function of the at least one localization feature.

The driving strategy is preferably determined in accordance with the present invention.

Advantageous embodiments of the present invention are described herein.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
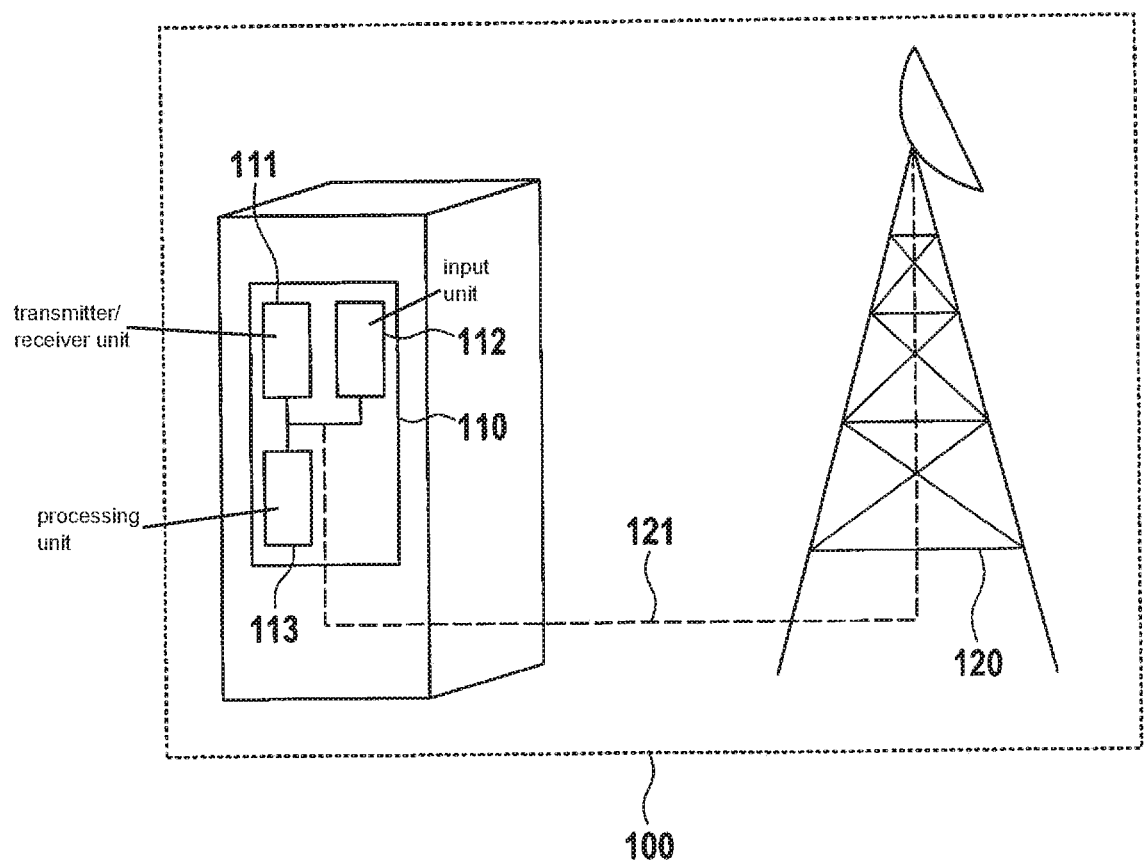
FIG. 1 shows an exemplary embodiment of the device according to the present invention.

FIG. 1 exemplarily illustrates a processing unit 100, which includes a device 110 for operating at least two automated vehicles 200, 210. A processing unit 100 is understood to be a server, for example. In another specific embodiment, a processing unit 100 is understood to be a cloud, thus a network of at least two electrical data processing systems, which exchange data over the Internet, for example. In another specific embodiment, processing unit 100 corresponds to device 110.

Device 110 includes a transmitter and receiver unit 111 for picking up 310 signals, which are transmitted in each case from the at least two automated vehicles 200, 210, and for providing 340 the common driving strategy for operating the at least two automated vehicles 200, 210, and includes an input unit 112 for inputting 320 a map as a function of the signals. Furthermore, device 110 includes a processing unit 113 for determining 330 a common driving strategy for the at least two automated vehicles 200, 210 in a way that optimizes a localization potential of the at least two automated vehicles 200, 210 on the basis of the map and as a function of the signals.

The designs of transmitter and receiver unit 111 and/or of input unit 112 and/or of processing unit 113 may differ depending on the respective embodiment of processing unit 100. If processing unit 100 is configured as a server, transmitter and receiver unit 111 and/or input unit 112 and/or processing unit 113 are/is localized at the same location, relative to the location of device 110.

If processing unit 100 is cloud-based, transmitter and receiver unit 111 and/or input unit 112 and/or processing unit 113 may be localized at different locations, for example, in different cities and/or countries, a connection, such as the Internet, for example, being designed for exchanging (electronic) data among/between transmitter and receiver unit 111, and/or input unit 112, and/or processing unit 113.

Transmitter and receiver unit 111 is designed to provide a common driving strategy for operating the at least two automated vehicles 200, 210, respectively for transmitting the same to the at least two automated vehicles 200, 210. Furthermore, transmitter and receiver unit 111 is designed to receive signals, which are transmitted in each case by the at least two automated vehicles 200, 210. In addition, transmitter and receiver unit 111 is able to transmit and receive data. In another specific embodiment, transmitter and receiver unit 111 is adapted to be linked via a wired and/or wireless connection 121 to a transmitter and/or receiver unit 122 that are/is configured externally to device 110. Furthermore, transmitter and receiver unit 111 includes electronic data processing elements, for example, such as a processor, main memory and a hard disk, which are designed for processing the received signals and/or the common driving strategy provided, in the form of data values, for example, for executing changes to and/or adapting the data format and for subsequently transmitting the same to the at least two automated vehicles 200, 210. In another specific embodiment, transmitter and receiver unit 111 is designed to transmit, respectively receive all data, without data processing elements.

Furthermore, the device includes an input unit 112 for inputting 320 a map as a function of the signals. For this purpose, input unit 112 includes electronic data processing elements, for example, a processor, a memory and a hard disk, on which the map is stored. In another specific embodiment, input unit 112 is adapted in such a way that the map is requested and/or received in the form of data values from a map delivery service. In another specific embodiment, input unit 112 is adapted to be linked via a wired and/or wireless connection 121 to a transmitter and/or receiver unit 122 that is configured externally to device 110, in order that the map be requested and/or received from a map delivery service. In another specific embodiment, input unit 112 is identical to transmitter and/or receiver unit 111.

Furthermore, device 110 includes a processing unit 113 for determining 330 a common driving strategy for the at least two automated vehicles 200, 210 in a way that optimizes a localization potential of the at least two automated vehicles 200, 210 on the basis of the map and as a function of the signals. For this purpose, processing unit 113 includes electronic data processing elements, for example, a processor, a memory and a hard disk. Furthermore, processing unit 113 includes an appropriate software, which is adapted for determining a driving strategy in accordance with inventive method 300.

The driving strategy includes a respective trajectory 201, 211, for example, for each of the at least two automated vehicles 200, 210 or a common trajectory along which the at least two automated vehicles 200, 210 are operated. Furthermore, the driving strategy includes, for example, a distance selection between the at least two automated vehicles 200, 210 and/or a velocity selection for the at least two automated vehicles and/or a lane selection for the at least two automated vehicles 200, 210, in particular in such a way that at least one of the at least two automated vehicles 200, 210 detects a localization feature via a driving environment sensor system 202, 212.

In a specific embodiment, the driving strategy provides, for example, for a data exchange among at least some of the at least two vehicles 200, 210. For example, the driving strategy is provided in such a way that a localization indication of at least one localization feature 220 is transmitted from an automated vehicle 200 to at least one further automated vehicle 210.

The driving strategy is determined, for example, in particular with regard to respective trajectory 201, 211 for each of the at least two automated vehicles 200, 210, by comparing different trajectories, which theoretically come into consideration, and selecting the best possible trajectory in each case, comparably to the principle of operation of a navigation system. This is accomplished, for example, as a function of the state variables of the at least two automated vehicles 200, 210.

Figure 2:
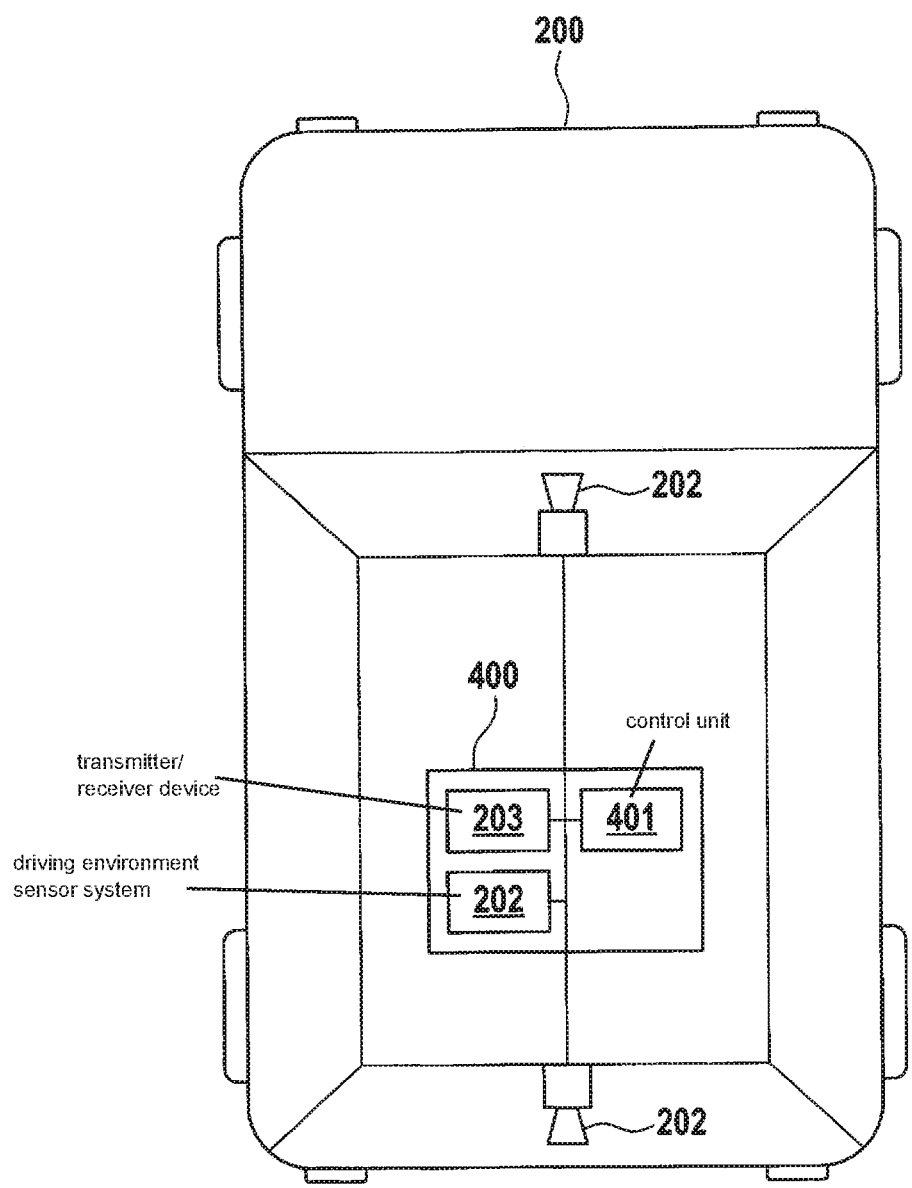
FIG. 2 shows an exemplary embodiment of the vehicle device according to the present invention.

FIG. 2 shows an automated vehicle 200 that includes a vehicle device 400 for operating automated vehicle 200. Here, automated vehicle 200 is exemplarily in the form of a passenger vehicle. In further specific embodiments, automated vehicle 200 is in the form of a truck or two-wheeled vehicle, for example.

Vehicle device 400 includes a transmitter and receiver device 203 for transmitting a signal to an external server 100 and for receiving a driving strategy from external server 100, a driving environment sensor system 202 for detecting at least one localization feature 220, the at least one localization feature 220 being detected at least as a function of the driving strategy, and a control unit 401 for operating automated vehicle 200 as a function of the driving strategy and as a function of the at least one localization feature 220.

Transmitter and receiver device 203 is adapted for receiving a driving strategy in the form of data values and for transmitting a signal in the form of data values to external server 100. In another specific embodiment, transmitter and receiver device 203 is adapted to be linked via a wired and/or wireless connection (for example, Bluetooth) to a transmitter and/or receiver unit that is configured externally to vehicle device 400. This may be a navigation system and/or smartphone, for example, which are/is included in automated vehicle 200.

Furthermore, transmitter and receiver device 203 is adapted for routing the received driving strategy to control unit 401 for operating automated vehicle 200. In another specific embodiment, transmitter and receiver device 203 includes electronic data processing elements, for example, a processor, a memory and a hard disk, which are designed for processing the received driving strategy, for example, for modifying and/or adapting the data format, and for subsequently routing it to control unit 401.

Furthermore, automated vehicle 200 includes a driving environment sensor system 202. This includes at least one sensor which is specific thereto and/or which is connected to sensors already included by automated vehicle 200. In a specific embodiment, driving environment sensor system 202 includes, for example, a processing unit (processor, memory, hard disk), as well as suitable software that is designed for detecting localization feature 220, which is sensed by the at least one sensor, for example, by object detection. Furthermore, driving environment sensor system 202 is designed in such a way that the at least one localization feature 220 is routed in the form of data values to control unit 401 for operating automated vehicle 200.

Furthermore, vehicle device 400 includes a control unit 401 for operating automated vehicle 200. Automated vehicle 200, for example, is thereby operated along a trajectory 201, for example, by control unit 401 controlling a transverse and/or longitudinal control of automated vehicle 200. In a specific embodiment, safety-related functions (airbag, emergency braking, etc.) are alternatively and/or additionally controlled, for example, on the basis of the driving strategy.

Figure 3:
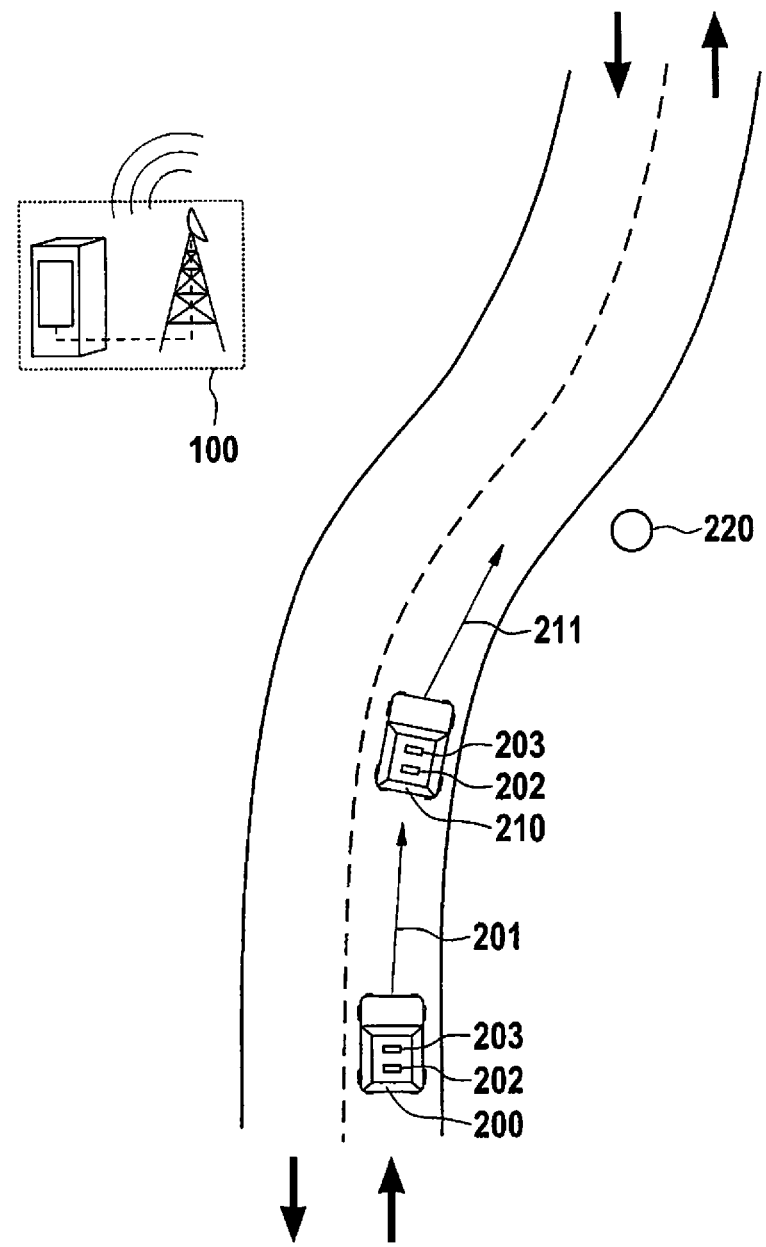
FIG. 3 is an exemplary embodiment of the method according to the present invention.

FIG. 3 shows an exemplary embodiment of method 300 according to the present invention.

In this case, the at least two automated vehicles 200, 210 are situated one after another in one lane of a traffic route. Each of the at least two automated vehicles 200, 210 transmits a signal to an external server 100 via a transmitter and receiver device 203, 213 that includes inventive device 100 for operating at least two automated vehicles 200, 210.

External server 100, respectively device 110 receives the signals. A map is subsequently input as a function of the signals. Via a processing unit 113, the device determines a common driving strategy for operating the at least two automated vehicles 200, 210 in a way that optimizes a localization potential of the at least two automated vehicles 200, 210 on the basis of the map and as a function of the signals.

In a specific embodiment, a trajectory 201, 211 for the at least two automated vehicles 200, 210 is determined in each case, for example, in such a way that a staggered driving of the at least two automated vehicles 200, 210 is carried out within the lane, enabling each of the at least two automated vehicles 200, 210 to detect at least one localization feature 220 using a driving environment sensor system 202, 212.

In a specific embodiment, staggered driving within a lane is not possible, for example, which is why the common driving strategy is determined in such a way, for example, that one of the at least two automated vehicles 200, 210 detects at least one localization feature 220 and all others of the at least two automated vehicles 200, 210 are operated in relation to one of the at least two automated vehicles 200, 210 in such a way that they are localized on the basis thereof. This is accomplished, for example, by transmission device 203, 213 transmitting the at least one localization feature 220 and/or a localization indication of the at least one localization feature 220 to each further one of the at least two automated vehicles 200, 210.

Figure 4:
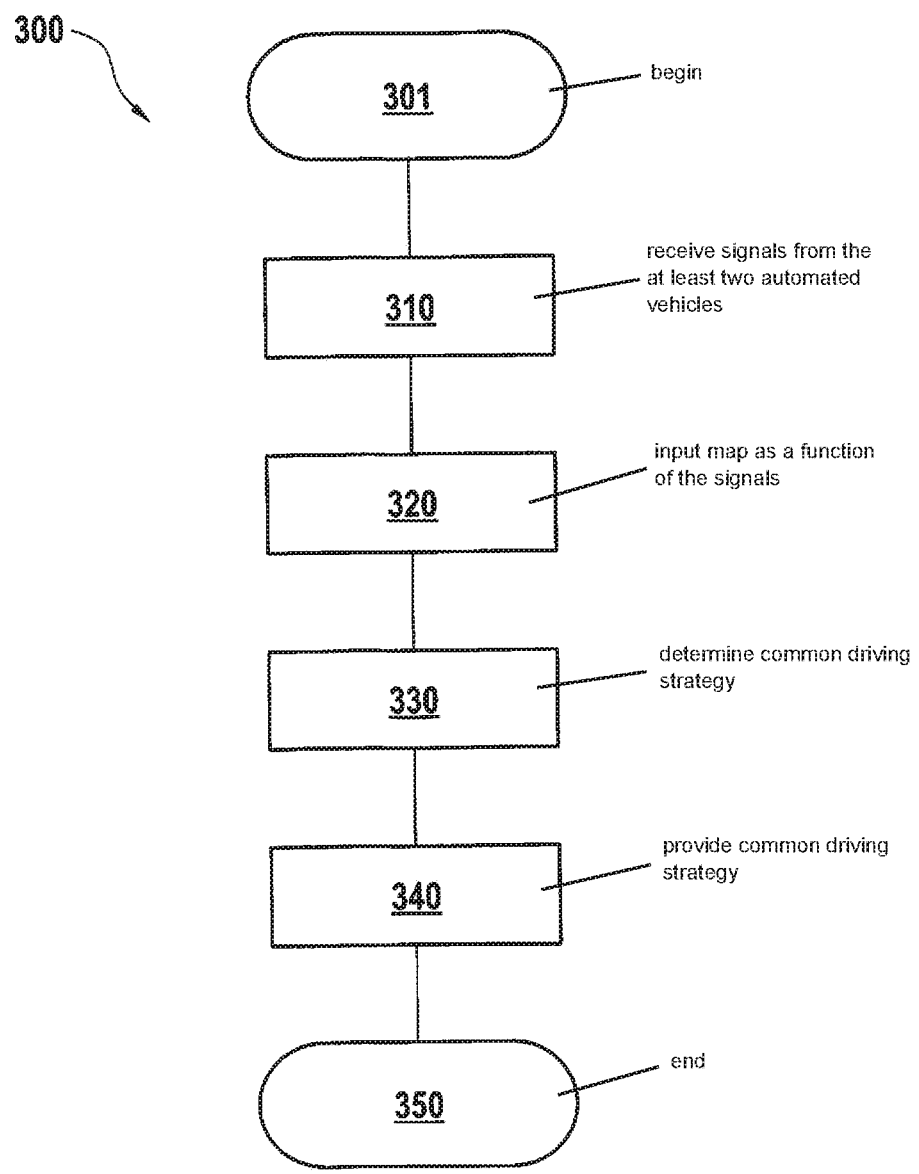
FIG. 4 is an exemplary embodiment of the method according to the present invention in the form of a flow chart.

FIG. 4 shows an exemplary embodiment of a method 300 for operating at least two automated vehicles 200, 210.

Method 300 begins in step 301.

In step 310, signals, which are transmitted in each case from the at least two automated vehicles 200, 210, are received.

In step 320, a map is input as a function of the signals.

In step 330, a common driving strategy is determined for the at least two automated vehicles 200, 210 in a way that optimizes a localization potential of the at least two automated vehicles 200, 210 on the basis of the map and as a function of the signals. For example, the localization potential is optimized by determining the common driving strategy in such a way that the at least two automated vehicles 200, 210 do not mutually obscure a localization feature 220, which is required, for example, for operating (localizing) each individual one of the at least two automated vehicles 200, 210.

The common driving strategy for operating the at least two automated vehicles 200, 210 is provided in step 340.

Method 300 ends in step 350.

What is claimed is:

1. A method for operating at least two automated vehicles, the method comprising:
   picking up signals which are each transmitted from the at least two automated vehicles;
   inputting a map as a function of the signals;
   determining a common driving strategy for the at least two automated vehicles that optimizes a localization potential of the at least two automated vehicles, based on the map, and as a function of the signals; and
   operating the at least two automated vehicles based on the common driving strategy;
   wherein the map includes at least one localization feature,
   wherein an accurate position of the automated vehicle is determined by detecting the localization feature and determining a position of the automated vehicle relative thereto, based on vector addition using a direction vector and a distance between the localization feature and the automated vehicle, and
   wherein the driving strategy includes a distance selection between the at least two automated vehicles, a velocity selection for the at least two automated vehicles, and a lane selection for the at least two automated vehicles, so that at least one of the at least two automated vehicles detects the localization feature via a driving environment sensor system.

2. The method as recited in claim 1, wherein the common driving strategy includes a respective trajectory for each of the at least two automated vehicles, and wherein the operation of the at least two automated vehicles takes place along the respective trajectory.

3. The method as recited in claim 2, wherein the localization potential of the at least two automated vehicles is optimized by the common driving strategy including the respective trajectory for each of the at least two automated vehicles so that, during the operation, each of the at least two automated vehicles detects the at least one localization feature in each case via the driving environment sensor system.

4. The method as recited in claim 2, wherein the localization potential of the at least two automated vehicles is optimized by the common driving strategy including the respective trajectory for each of the at least two automated vehicles so that at least one of the at least two automated vehicles detects the at least one localization feature via the driving environment sensor system; and wherein the at least one localization feature and/or a localization indication of the at least one localization feature is transmitted to each further one of the at least two automated vehicles by a transmission device.

5. The method as recited in claim 1, wherein the signals represent at least one current location in each case and one destination in each case of the at least two automated vehicles and/or state variables of the at least two automated vehicles.

6. A device for operating at least two automated vehicles, comprising:
   a transmitter and receiver unit to pick up signals which are each transmitted from the at least two automated vehicles, and to provide a common driving strategy for operating the at least two automated vehicles;
   an input unit to input a map as a function of the signals;
   a processing unit to determine a common driving strategy for the at least two automated vehicles that optimizes a localization potential of the at least two automated vehicles based on the map, and as a function of the signals; and operating the at least two automated vehicles based on the common driving strategy;

wherein the map includes at least one localization feature, and wherein an accurate position of the automated vehicle is determined by detecting the localization feature and determining a position of the automated vehicle relative thereto, based on vector addition using a direction vector and a distance between the localization feature and the automated vehicle, and wherein the driving strategy includes a distance selection between the at least two automated vehicles, a velocity selection for the at least two automated vehicles, and a lane selection for the at least two automated vehicles, so that at least one of the at least two automated vehicles detects the localization feature via a driving environment sensor system.

7. The device as recited in claim 6, wherein the transmitter and receiver unit and/or the input unit and/or the processing unit, is configured to perform a method comprising picking up the signals which are each transmitted from the at least two automated vehicles, inputting the map as the function of the signals, determining a common driving strategy for the at least two automated vehicles in a way that optimizes a localization potential of the at least two automated vehicles, based on the map, and as a function of the signals, and providing the common driving strategy for the operating of the at least two automated vehicles.

8. A vehicle device for operating an automated vehicle, comprising:

a transmitter and receiver unit to transmit a signal to an external server and to receive a driving strategy from the external server;

a driving environment sensor system to detect at least one localization feature, the at least one localization feature being detected at least as a function of the driving strategy; and a control unit to operate the automated vehicle as a function of the driving strategy, and as a function of the at least one localization feature;

wherein the at least two automated vehicles are operated based on the common driving strategy, and wherein the map includes at least one localization feature, and wherein an accurate position of the automated vehicle is determined by detecting the localization feature and deteiniining a position of the automated vehicle relative thereto, based on vector addition using a direction vector and a distance between the localization feature and the automated vehicle, and wherein the driving strategy includes a distance selection between the at least two automated vehicles, a velocity selection for the at least two automated vehicles, and a lane selection for the at least two automated vehicles, so that at least one of the at least two automated vehicles detects the localization feature via the driving environment sensor system.

9. The vehicle device as recited in claim 8, wherein the driving strategy is determined by the external server, which is configured to perform the following:

picking up signals which are each transmitted from the at least two automated vehicles;

inputting a map as a function of the picked-up signals;

determining a common driving strategy for the at least two automated vehicles that optimizes a localization potential of the at least two automated vehicles, based on the map, and as a function of the signals; and providing the common driving strategy for operating the at least two automated vehicles; and operating the at least two automated vehicles based on the common driving strategy.

\* \* \* \* \*